United States Patent Office 2,886,547
Patented May 12, 1959

2,886,547

SOLUTION OF VINYLIDENE CHLORIDE POLYMER IN A PYRROLIDONE SOLVENT

Durward A. Baggett, Galveston, and Holmes H. McClure, Lake Jackson, Tex., assignors to The Dow Chemical Company, Midland, Mich., a corporation of Delaware No Drawing. Application March 5, 1956
Serial No. 569,264

5 Claims. (Cl. 260—30.2)

This invention relates to new solvents for polymers composed predominantly of vinylidene chloride and to the solutions prepared therefrom. For purposes of this application the term solution should be construed as having the meaning employed in the high polymer art. In that art solution means a homogeneous miscible dispersion of the polymeric solute throughout the solvent to produce a clear pourable liquid.

Polyvinylidene chloride and polymers consisting predominantly of vinylidene chloride have been known to have many desirable and unique properties. Articles prepared from such polymers have high strength and hardness, a very low rate of moisture vapor transmission, and extreme inertness to the common organic solvents. Because of their thermal instability and insolubility, however, such polymers have never been able to be fully exploited commercially. Thus, when it was attempted to extrude or to mold the polymers thermally the molten polymer charred even before leaving the die or mold. The polymers could not be spun or cast because solutions of great enough concentration could not be prepared without gelation at convenient operating temperatures. Consequently these inexpensive, easily prepared, and valuable polymers have been passed by while investigators have attempted to modify other polymers to build in properties which are inherent in vinylidene chloride polymers.

It would be desirable and it is the principal object of this invention to provide new and improved solvents for polymers consisting predominantly of vinylidene chloride.

It is a further object to provide solutions of such polymers in such new and improved solvents in a concentration great enough so that useful fibers, films, and the like may be produced therefrom.

It is a still further object to provide such solutions which may be kept at normal temperatures without gelation.

The above and related objects are accomplished by means of a solution comprising a solvent selected from the group consisting of 1,5-dimethyl-2-pyrrolidone or N-methyl-2-pyrrolidone and a polymer composed predominantly of vinylidene chloride.

The vinylidene chloride polymers which are meant to be included within the scope of the invention are those prepared from at least 85 percent by weight of vinylidene chloride with correspondingly from 15 to 0 percent by weight of a comonomer, such as vinyl chloride or vinyl acetate.

The solutions are conveniently prepared by slowly adding the polymer in finely divided form to the solvent at an elevated temperature and under vigorous agitation. By elevated temperature is meant at about 100° C. Lower temperatures require a correspondingly longer time for dissolution. Following dissolution, the solutions may be cooled to room temperature and maintained there for relatively long periods of time without gelation occurring.

It is possible to prepare these solutions in concentrations of 45 percent by weight or greater. Concentrations of from 10–40 percent are practical for spinning and casting operations. The more concentrated solutions are clear, transparent and highly viscous. Solutions prepared in smaller concentrations are likewise clear and transparent and correspondingly less viscous and are capable of being employed in casting and spinning operations at relatively low temperatures, such as room temperature. It may be desirable to use the more concentrated and thus more viscous solutions at elevated temperatures during spinning and casting operations to achieve faster rates of production or for other reasons.

The polymer is precipitated from the solution by the addition of a non-solvent such as water. This allows for the production of fibers and unsupported films by spinning the solution into water or on the surface of water. The solutions may likewise be employed in dry spinning operations. For this purpose elevated temperatures are usually employed to provide a more favorable evaporative environment.

The polymer solutions may likewise be employed as lacquers for the coating of articles. In this case the article is coated with the solution by any known means for applying lacquers and the solvent then removed by subjecting the coated article to evaporative conditions.

The advantages of the solutions will be more apparent from the following illustrative examples wherein all parts are by weight.

*Example 1*

One part by weight of finely divided polyvinylidene chloride was added to 5 parts by weight of 1,5-dimethyl-2-pyrrolidone at 100° C. with vigorous stirring. A clear and colorless solution was obtained which did not gel upon being cooled to 20° C. A colorless film was prepared by casting the solution onto a smooth surface and washing with water. When the film was stripped from the surface it was found to be tough and flexible.

Continuous fibers were prepared by spinning a fine stream of the solution into water.

*Solution 2*

A solution was prepared by stirring one part of a copolymer containing 90 percent by weight of vinylidene chloride and 10 percent by weight of vinyl chloride into five parts of N-methyl-2-pyrrolidone at 100° C. with vigorous stirring. A clear colorless solution resulted which did not gel when cooled to 20° C. Fibers and films were prepared from this solution in the manner described in Example 1.

*Example 3*

One part of a copolymer containing 85 percent by weight of vinylidene chloride and 15 percent by weight of vinyl acetate was added with vigorous stirring to 5 parts of N-methyl-2-pyrrolidone at 100° C. A clear colorless solution resulted which did not gel when cooled to 20° C. Fibers and films were obtained from this solution in the manner described in Example 1.

*Example 4*

A solution was prepared by dissolving 3.5 parts of polyvinylidene chloride into 5 parts of 1,5-dimethyl-2-pyrrolidone at 100° C. with vigorous stirring. A clear and colorless solution was obtained which would not gel upon cooling to room temperature. The solution was used to cast useful clear, transparent films.

*Example 5*

To 5.7 parts of 1,5-dimethyl-2-pyrrolidone at 100° C. was added 4.3 parts of finely divided polyvinylidene chloride with vigorous stirring. A clear, colorless solution resulted which was highly viscous but did not gel upon being cooled to room temperature.

We claim:

1. A solution of a polymer selected from the group consisting of polyvinylidene chloride and copolymers of at least 85% vinylidene chloride with up to 15 percent of a monoethylenic vinyl ester, and a solvent selected from the class consisting of N-methyl-2-pyrrolidone and 1,5-dimethyl-2-pyrrolidone.

2. The solution claimed in claim 1 wherein said polymer is polyvinylidene chloride.

3. The solution claimed in claim 1 wherein said polymer is a copolymer of vinylidene chloride and vinyl chloride.

4. The solution claimed in claim 1 wherein said polymer is a copolymer of vinylidene chloride and vinylacetate.

5. The solution claimed in claim 1 wherein the polymer is present in the concentration if not more than 45 percent by weight.

References Cited in the file of this patent

UNITED STATES PATENTS

| | | |
|---|---|---|
| 2,404,722 | Houtz | July 23, 1946 |
| 2,460,579 | Houtz | Feb. 1, 1949 |
| 2,686,773 | D'Alelio | Aug. 17, 1954 |
| 2,756,218 | Ham | July 24, 1956 |